United States Patent [19]

Gray et al.

[11] Patent Number: 4,584,751
[45] Date of Patent: Apr. 29, 1986

[54] APPARATUS FOR ASSEMBLING FIN PLATE HEAT EXCHANGERS

[75] Inventors: Kenneth P. Gray, East Syracuse; James E. Greever, DeWitt, both of N.Y.

[73] Assignee: Carrier Corporation, Syracuse, N.Y.

[21] Appl. No.: 605,097

[22] Filed: Apr. 30, 1984

[51] Int. Cl.4 .............................................. B23P 15/26
[52] U.S. Cl. ............................ 29/157.3 C; 29/157.4; 29/727; 29/523
[58] Field of Search ................ 29/157.3 R, 157.3 C, 29/157.4, 726, 727, 464, 466, 467, 33 G, 523, DIG. 43, 445, 464; 414/27

[56] References Cited

U.S. PATENT DOCUMENTS

| | | | |
|---|---|---|---|
| 3,437,133 | 4/1969 | Bullard | 29/157.4 X |
| 3,487,523 | 1/1970 | Ames | 29/523 X |
| 3,688,533 | 9/1972 | Ames | 29/727 X |
| 3,824,668 | 7/1974 | Wightman | 29/727 |
| 4,195,540 | 4/1980 | Franks | 414/27 X |
| 4,228,573 | 10/1980 | Barnard | 29/157.3 R |
| 4,286,486 | 9/1981 | Franks | 29/157.3 R X |
| 4,321,739 | 3/1982 | Martin et al. | 29/157.3 R X |
| 4,459,917 | 7/1984 | Michael et al. | 29/157.3 R X |

FOREIGN PATENT DOCUMENTS 859101  8/1981  U.S.S.R. ................................. 29/726

Primary Examiner—Carl E. Hall
Attorney, Agent, or Firm—Thomas J. Wall

[57] ABSTRACT

A method and apparatus for automatically assembling hairpin tubes in the tube receiving holes of a fin pack unit. Pre-assembled fin pack units are serially moved from one station to the next to receive hairpin tubes, to have bells formed in the open ends of the laced hairpin tubes, to have expansion tools inserted upwardly through the open ends of the hairpin tubes to expand the walls of the tubes outwardly into contact against the fin plates and tube sheets with sufficient force to lock the tubes into the unit, and to have return bends interconnect the bell-like seats of adjacent hairpin tubes and thus complete the heat exchanger flow circuit.

20 Claims, 25 Drawing Figures

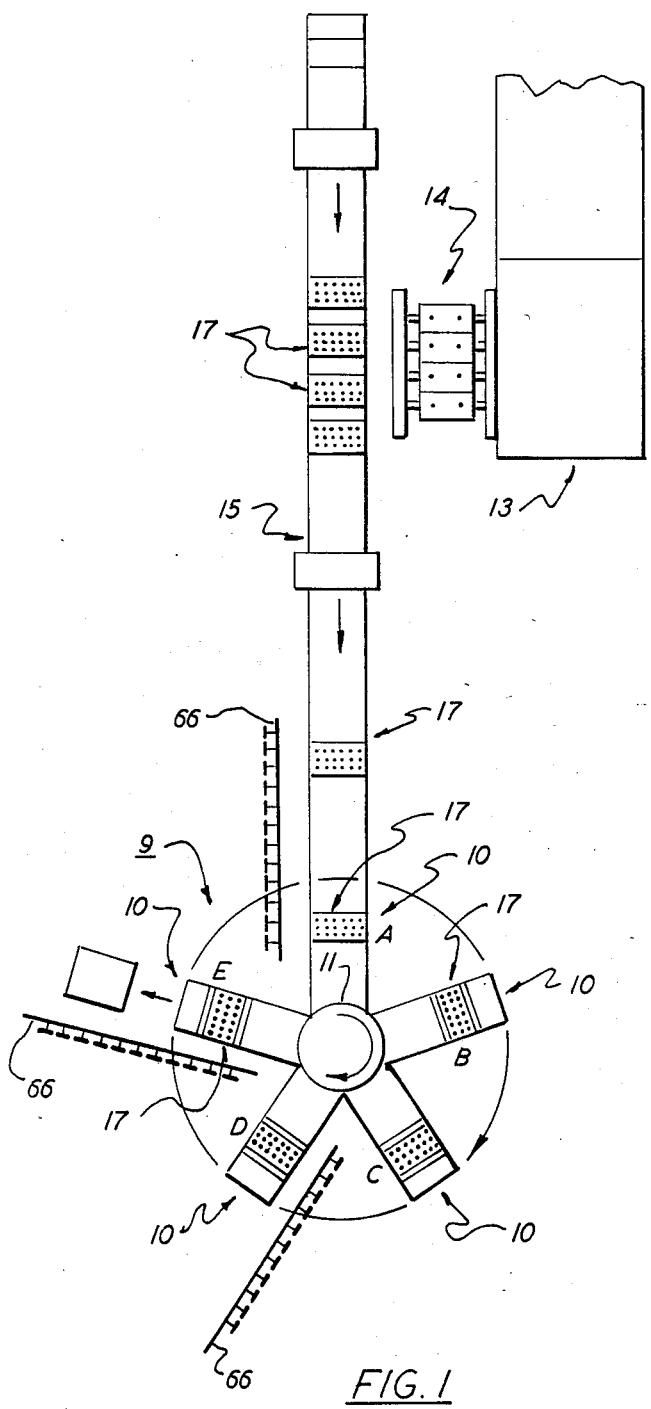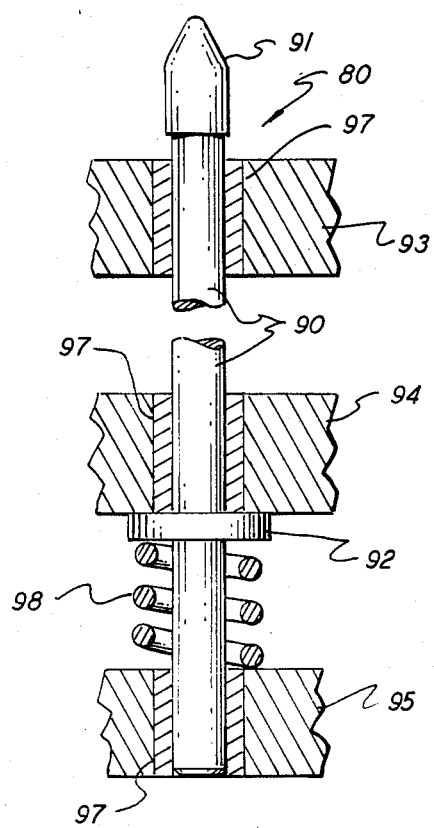
FIG. 1
FIG. 14

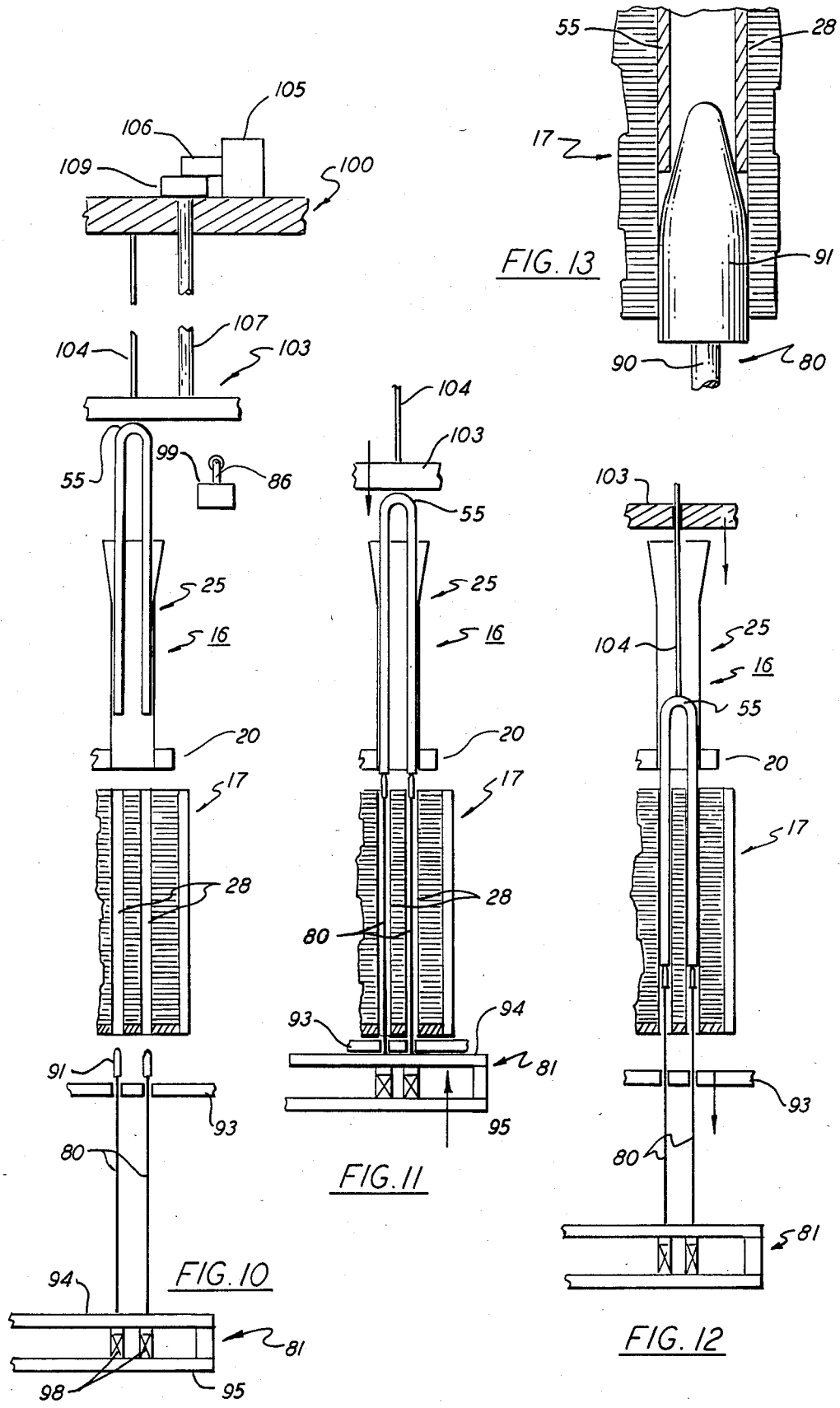

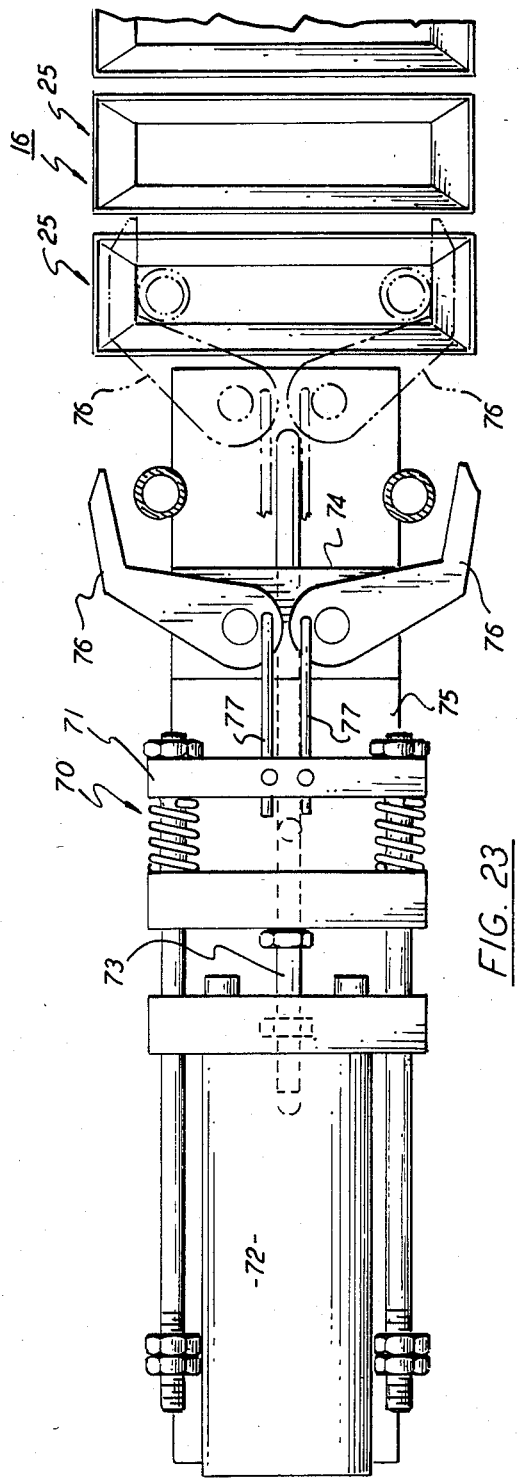
FIG. 23
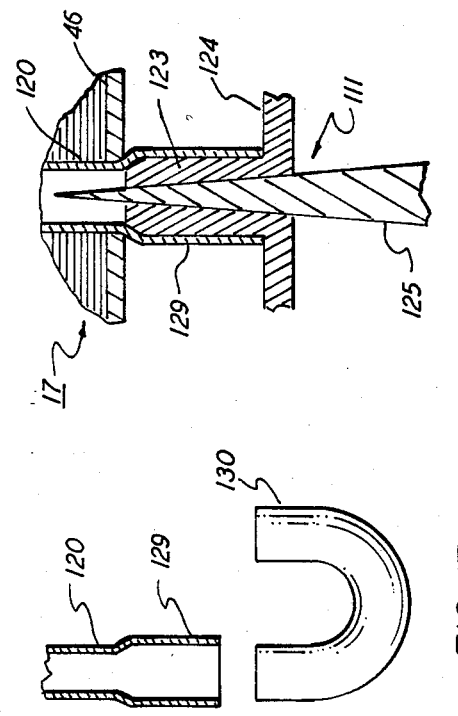
FIG. 16
FIG. 17
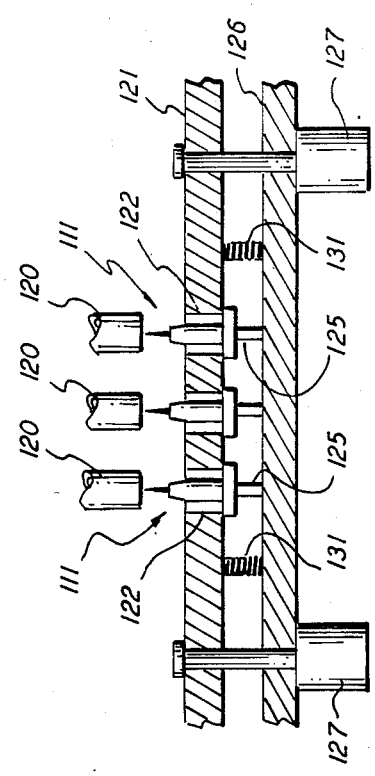
FIG. 15

APPARATUS FOR ASSEMBLING FIN PLATE HEAT EXCHANGERS

BACKGROUND OF THE INVENTION

This invention relates to an automated machine for assembling a heat exchanger having perforated plate fins interposed between a pair of perforated tube sheets and being interlaced with hairpin tubes and, in particular, to lacing and expanding hairpin tubes into the plate-fin coil.

In U.S. Pat. No. 4,228,573 which issued to Barnard, there is disclosed an automated machine for manufacturing fin plate heat exchangers of the type suitable for use in air conditioning systems. Each unit, as it is being assembled, is retained within a holding fixture with the tube receiving holes of the retained fin pack being supported in a generally horizontal position. Initially, the perforated fins and one perforated tube sheet or header are placed in the fixture and then clamped in place using a pair of jaws that are adapted to swing upwardly into locking engagement against the perforated end faces of the partially assembled unit. The fixture is then passed through a series of processing stations wherein the hairpins are laced into the package, a second header is inserted over the laced tube ends and finally the tubes are expanded into locking contact against the surrounding elements.

The fixtures containing the retained units in the Barnard device are carried between processing stations on a conveyor belt. At each processing station, the fixture is lifted from the belt and carried to a remote position wherein a specific manufacturing step is carried out. Upon the completion of the operation, the fixture is again returned to the conveyor belt and moved to the next subsequent station. The timing of the various operational steps in Barnard is not coordinated and, in order to avoid bottlenecks along the line, fixtures containing partially assembled units are moved to temporary overhead storage areas where they are held until needed. As a consequence, each fixture must be loaded and unloaded from the main conveyor a number of times before the assembly operation is completed. This excessive handling slows down the automated process and raises the unit cost of the assembled units. The apparatus needed to carry out the many handling and processing steps is also relatively complex and difficult to maintain.

A further disadvantage associated with the Barnard machine concerns the clamping mechanism used to hold the units within each of the fixtures. The clamps are arranged to act upon the perforated end faces of the units and thus prevent access to these critical areas during the manufacturing process. During a number of assembly operations, the clamps must be lowered so that the operation can be completed. This, of course, releases the unit from the fixture at a time when it is being worked upon. As a consequence the fin plates can become misaligned or damaged and, as a consequence, the unit may eventually have to be scrapped.

It should be noted that in Barnard the hairpin tubes are laced into the fin packs in a row by row progression. Each row of tubes is horizontally disposed with a tray so that the legs of the tubes are aligned with the tube receiving holes formed in the unit. The hairpin tubes are then pushed from the tray through the fin pack unit with the aid of lacing rods at a first processing station and the unit moved into a second processing station where the tubes are expanded. In the event the heat exchanger unit requires more than one row of hairpins, extra lacing and expanding stations must be added to the machine to accommodate each additional row. In an assembly having four rows of hairpins, for example, four lacing and expanding stations would be needed to fully lace a single unit. Clearly, this large number of processing stations consumes a great deal of valuable floor space and requires the utilization of large amounts of redundant tooling.

Lastly, it should be pointed out that the tube expansion process practiced by Barnard produces non-uniform changes in the length of the tube legs. Upon lacing the hairpins into the fin pack, Barnard firmly supports the bend end of the tubes firmly against movement and then drives an expanding tool upwardly through the open end of the tubes. Under the action of the tool, the metal in the tubular legs is compressed axially as it is expanded radially. The tube legs are thus caused to shrink in length and this shrinkage may be non-uniform. As a consequence the length of the tubes between the bottom tube sheet and the end of the tubes varies between tubes. This, in turn, can cause misalignment problems and the like when the tube ends are later belled and the return bends are mounted therein.

SUMMARY OF THE INVENTION

It is therefore an object of the present invention to improve apparatus for manufacturing fin plate heat exchangers.

It is a further object of the present invention to provide an improved automated machine for lacing hairpin tubes into a plate fin unit.

A still further object of the present invention is to minimize the number of handling and processing steps required to automatically assemble a fin plate heat exchanger.

Yet another object of the present invention is to minimize the amount of space and equipment needed for the automated assembly of a fin plate heat exchanger.

Another object of the present invention is to provide an automated machine for assembling a fin plate heat exchanger wherein the hairpin tubes of the exchanger are expanded in tension in order to prevent uneven changes in the axial length of the tube legs.

Still another object of the present invention is to increase the rate of production of an automated machine for assembling fin plate heat exchangers.

A further object of the present invention is to support a fin pack unit within an automated assembling machine so that both perforated ends of the unit are freely accessible to the processing equipment.

These and other objects of the present invention are attained by an apparatus for automatically assembling hairpin tubes in the tube receiving holes of a fin pack unit that includes a movable support for holding a fin pack unit in an upright position with the tube receiving holes in vertical alignment, a tube magazine for locating a series of hairpin tubes over the unit with the tubes in registration with the receiving holes, a lacing device for passing the tubes from the magazine through the unit so that the open ends of the tubes extend beyond the lower tube sheet of the unit, a belling tool for forming return bend tubes in the extended open ends of the tubes, a clamping fixture for securing the tube bells against axial movement and an expanding tool mechanism for passing upwardly through the tubes to expand the tubes into contact against the fin plates and tube sheets of the unit.

BRIEF DESCRIPTION OF THE DRAWINGS

For a better understanding of these and other objects of the present invention reference is had to the following detailed description of the invention wherein:

FIG. 1 is a schematic diagram of an apparatus embodying the teachings of the present invention showing a turntable for transporting heat exchanger units through a series of processing stations;

FIGS. 10, 11 and 12 are enlarged side elevations illustrating the steps involved in aFtomatically lacing hairpin tubes into a fin pack unit;

FIG. 13 is a further enlarged partial side elevation showing an extended lacing rod in the act of engaging the open end of a hairpin tube;

FIG. 14 is an enlarged partial side elevation in section showing a spring coupling used to connect each of the rods to a movable base plate;

FIG. 15 is an enlarged side elevation in partial section showing a movable belling table used in the tube belling station illustrated in FIG. 4;

FIG. 16 is a further enlarged view of a bell forming tool used in the practice of the present invention showing the tool inserted within the open end of a hairpin tube;

FIG. 17 is an exploded view showing a tube bend positioned beneath the belled end of a tube;

FIG. 23 is an enlarged plan view of the automatic tube guide used in the tube loader shown in FIG. 22;

DESCRIPTION OF THE INVENTION

Figure 2:
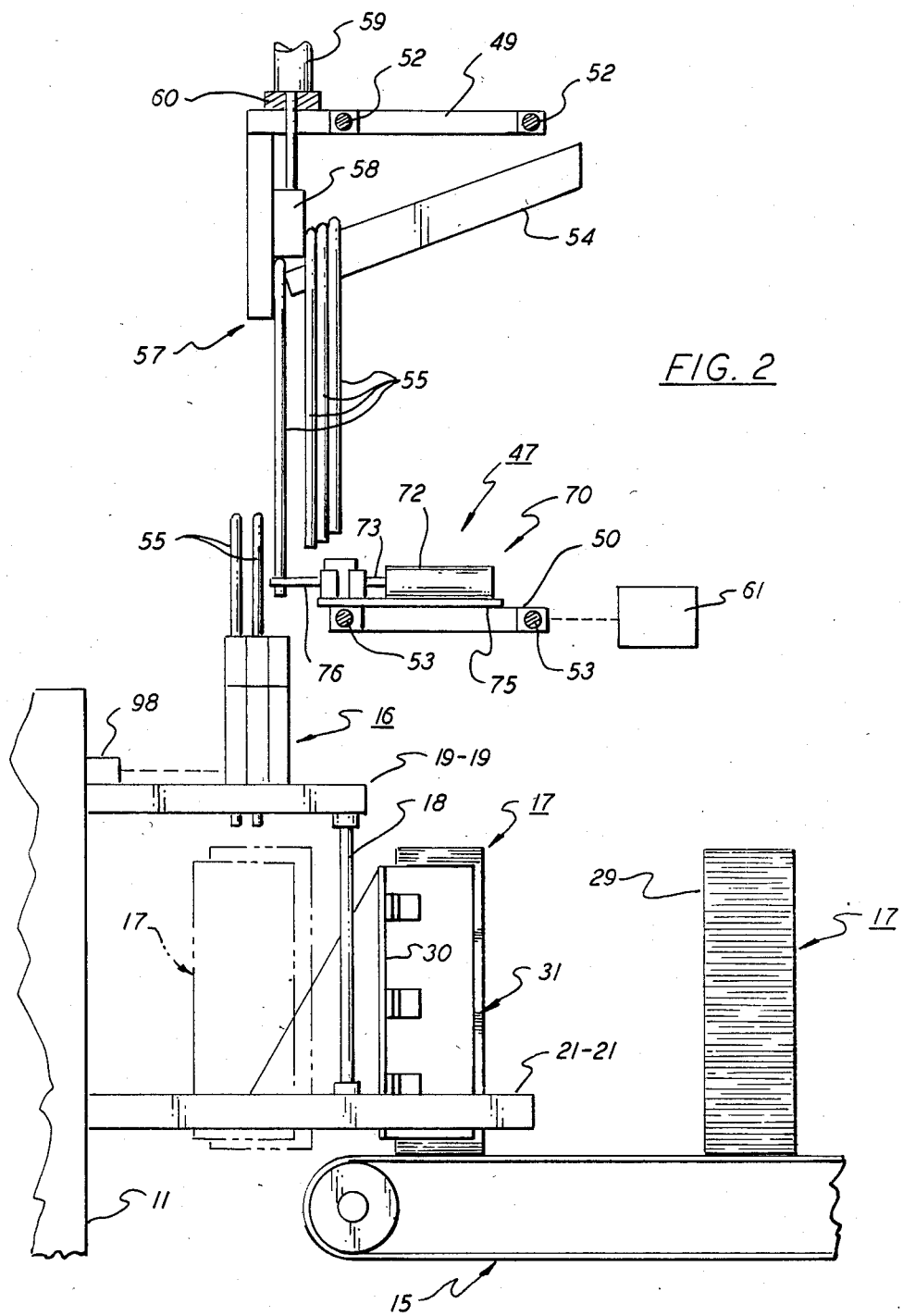
FIG. 2 is a side elevation in diagramatic form showing a first processing station for loading fin pack units into the present apparatus.

Turning now to the drawings wherein like numbers are used to identify like parts, there is shown in FIG. 1 a schematic representation of an automated machine, generally referenced 9, for processing heat exchanger fin pack units. The apparatus includes a turntable 11 having a plurality of equally spaced support fixtures 10—10 radially disposed therefrom. As indicated by the arrow, the turntable is arranged to bring the support fixtures in sequence through a number of processing stations A-E. Station A represents a loading station wherein pre-assembled fin pack units 17—17 are loaded into the machine. For purposes of this disclosure, a fin pack unit includes a series of pre-stamped perforated plate fins that are stacked one over the other between a pair of perforated headers or tube sheets. The plate fins are typically stamped from thin sheets of metal so that the plates are the same size and contains similarly disposed holes passing therethrough. The perforated tube sheets are stamped from a heavier gage metal, and contain the same hole pattern as the fin plates. When stacked in assembly the perforations are axially aligned to establish tube receiving holes that extend through the pack between the tube sheets. To close the assembly hairpin tubes are passed through the holes and the walls of the tubes expanded radially to lock the tubes against the fin plates and tube sheets of the unit.

The fins are typically formed in an automatic stamping machine as shown at 13 in FIG. 1 and then brought to an assembly area 14 where the fins and tube sheets are stacked in alignment to create a fin pack unit 17. The assembled units are next transferred onto a moving conveyor 15 and transported seriatim to the previously noted loading station A of the present apparatus. A device for stacking and conveying fin pack units of this nature is described in greater detail in U.S. Pat. Nos. 4,286,486, 4,285,256 and 4,195,540.

Once loaded into the support fixture the fin pack is indexed into the next station B wherein hairpin tubes are passed from a supply magazine 16 downwardly into the fin pack unit. The term hairpin tube or simply hairpin, is used herein in reference to an elongated tube that is bent into a U-like configuration so that each leg thereof is of substantial length. In the present embodiment of the invention, the magazine is mounted upon the support fixture above the fin pack and is arranged to move therewith through the various processing stations.

The unit is next indexed into a downstream station C where bells are formed in the open ends of the hairpin tubes which due to the previously noted lacing operation extend downwardly beyond the bottom tube sheet of the unit. Here the tube ends are expanded outwardly in a radial direction to establish bell-like seats for receiving return bends. The return bends are semicircular members used to interconnect the legs of adjacent hairpins and thus complete the heat exchanger flow circuit. A pressure tight joint is formed between the return bends and the receiving bells by soldering the bend in the bell. Normally, the length of tubing extending between the bell and the adjacent tube sheet represents the weakest section in the flow circuit wherein hydrostatic rupturing of the circuit typically occurs. However, by properly preparing and forming the bells as herein explained, this unsupported section of tubing is eliminated so that a high strength joint can be attained in this critical region.

After belling, the fixture is indexed into a tube expanding station D where expanding tools are passed upwardly through the open ends of the hairpins. The tools are designed to expand the walls of the tubes outwardly into contact against the fin plates and tube sheets of the unit with sufficient force to lock the tubes into the unit. The tubes, once locked in place, combine with the tube sheets to provide a secure self-standing unit.

The unit is lastly forwarded via the turntable 11 to an unloading station E where it is released from the support fixture and unloaded from the machine. Typically, the assembled unit will be taken to a degreasing station where it is cleaned prior to carrying out the return bend assembly operation.

The operation of the present machine will now be explained in greater detail with reference to the five processing stations. However, the number may vary without departing from the teachings of the present invention. The turntable 11 includes five equally spaced support fixtures radially disposed therefrom. Each fixture further includes an upper set of arms 19—19 (FIG. 2) and a lower set of arms 21—21 that are secured to the turntable by any suitable means. A tube magazine 16 is supported between the upper pair of arms while the fin pack unit 17 is releasably secured in the lower set of arms.

Figure 7:
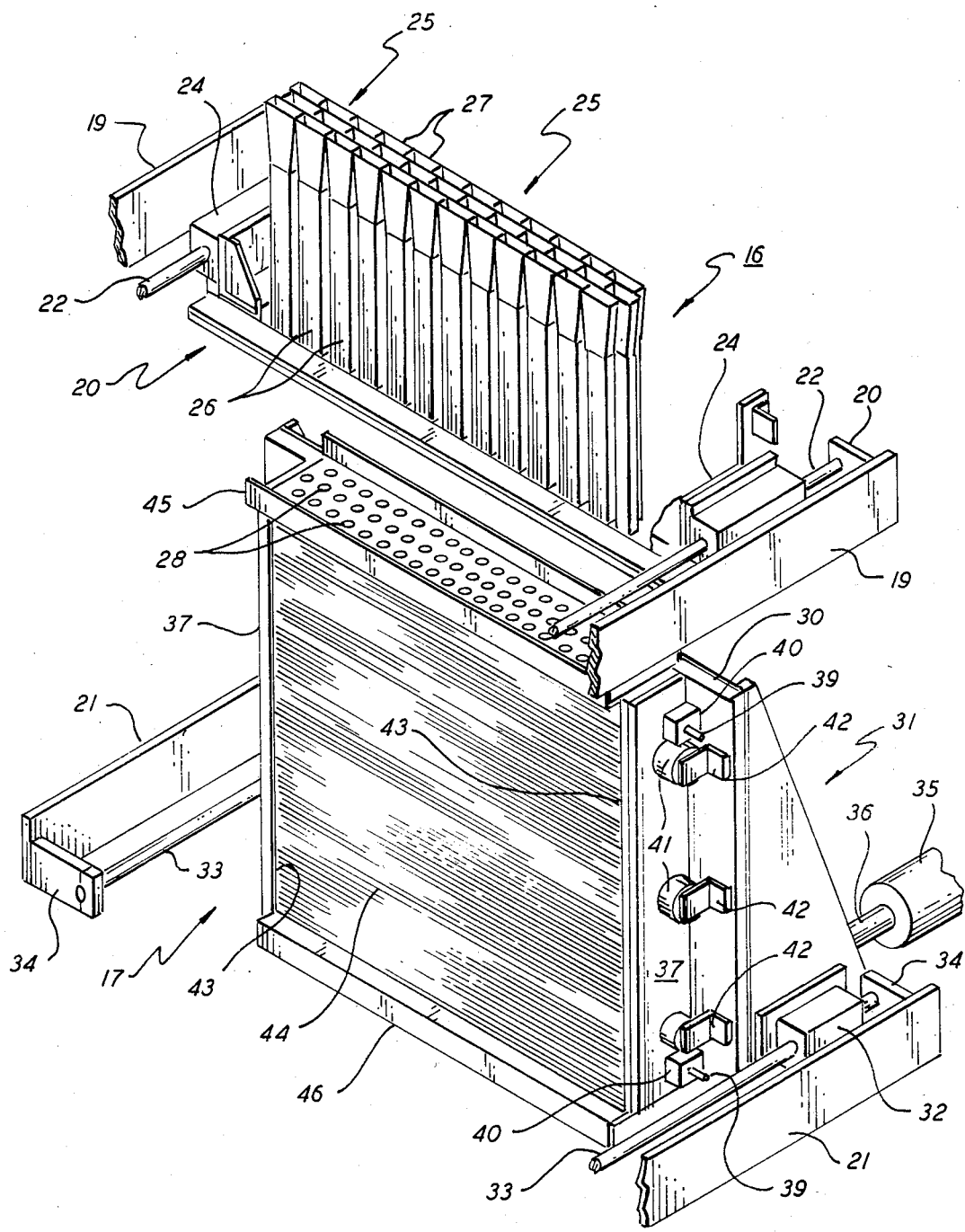
FIG. 7 is a partial perspective view of the loading station shown in FIG. 2 illustrating a fin pack unit mounted therein.

As best seen in FIG. 7 the tube magazine 16 is seated upon a platform 20 that is suspended between a pair of cylindrical rails 22 by bearing block 24—24. The rails are secured by brackets 20 to the upper arms of the support fixture. The tube magazine contains a series of upraised tube nests 25—25 of hollow construction. Each nest includes a generally rectangular body section 26 and an upwardly depending funnel-shaped entrance section 27.

In the present embodiment of the invention, there is illustrated a fin pack unit 17 containing three parallel rows of tube receiving holes 28—28. In assembly the hairpins are passed through the holes so that the tube legs are aligned within the plane of a particular row. Accordingly, the magazine also contains three parallel rows of nests that are arranged to support the legs of tubes stored therein in axial alignment with the underlying tube receiving holes. As will be explained in greater detail below, the tubes are automatically fired into the nests from a tube loader to fill the nests prior to indexing the support fixture into the lacing station.

Although three parallel rows of hairpin tubes are utilized in the present fin pack, it should be understood that the number of rows, as well as the number of tubes in each row can change depending upon the nature of the heat exchanger being assembled. Similarly, the angular alignment of the tubes can also change. To accommodate for these changes, the support platform 20 can be removed from the bearing blocks and replaced with a new unit having nests that are specifically configured to conform with the new hole pattern. The magazine can be further horizontally repositioned on the rails 22—22 to finely adjust the location of the magazine in relation to the fin pack.

As illustrated in FIG. 2 the fin pack units are brought into the loading station via an endless belt conveyor 15 of any suitable construction. The units are conveyed in upright posture with the tube receiving holes 28—28 disposed in a generally vertical direction. Upon entering the loading station, the back of the fin pack unit is indexed against the back wall 30 of a movable carriage generally referenced 31. The carriage is carried via bearing housings 32—32 upon a pair of parallel guide rails 33—33 that, in turn, are secured to the lower arms 21—21 of the turntable assembly via brackets 34—34. The carriage is adapted to reciprocate between a first extended position as shown in FIG. 2 and a second retracted position beneath the tube magazine as shown in FIG. 7. Movement of the carriage between the two positions is effected by means of a double-acting hydraulic cylinder 35 that is operatively attached to the carriage by means of a piston rod 36.

A pair of clamping members 37—37 of similar construction are supported upon the back wall 30 of the carriage 31 by means of pins 39—39. The pins are slidably carried within bearing blocks 40—40 affixed to the back plate. Air cylinders 41—41 are connected to angle brackets 42—42 which are also secured to the back plate. The air cylinders are arranged to act upon the clamping members to move the members toward and away from the sidewalls of the plate fin unit positioned therebetween. The inside surface of each clamping member is covered with a soft deformable pad of rubber-like material 43 that is capable of deforming about the end walls of the fin plates 45 and tube sheets 46 without bending or compressing the contacted members. The cylinders 41—41 deliver a uniform holding force along the length of the pads to securely hold the unit within the carriage so that it is prevented from being displaced as it is being processed in the downstream workstations.

As can be seen, once secured between the clamping members, the top and bottom tube sheets of the fin pack unit are freely accessible without having to remove the unit from the fixture. After a unit 17 has been loaded into the carriage, the carriage is moved back from the loading position into a lacing position beneath the tube magazine. This latter position is shown in phantom outline in FIG. 2. When retracted into the lacing position, the tube receiving holes of the fin pack unit are aligned with the tube nest in the overhead magazine so that the tubes stored therein can be passed freely into the magazine.

The magazines mounted in each of the support fixtures 10 are loaded in three steps. Initially the first row of nests is loaded when the magazine is positioned in the tube expanding station D, the second row when the magazine is positioned in the unloading station E and the last row when the magazine is positioned in the loading station A. Accordingly, each magazine will be fully loaded as it is indexed into the lacing station B. The partial loading cycles can be carried out well with the indexing period of the machine and thus not cause any delay in the overall assembly time.

Figure 5:
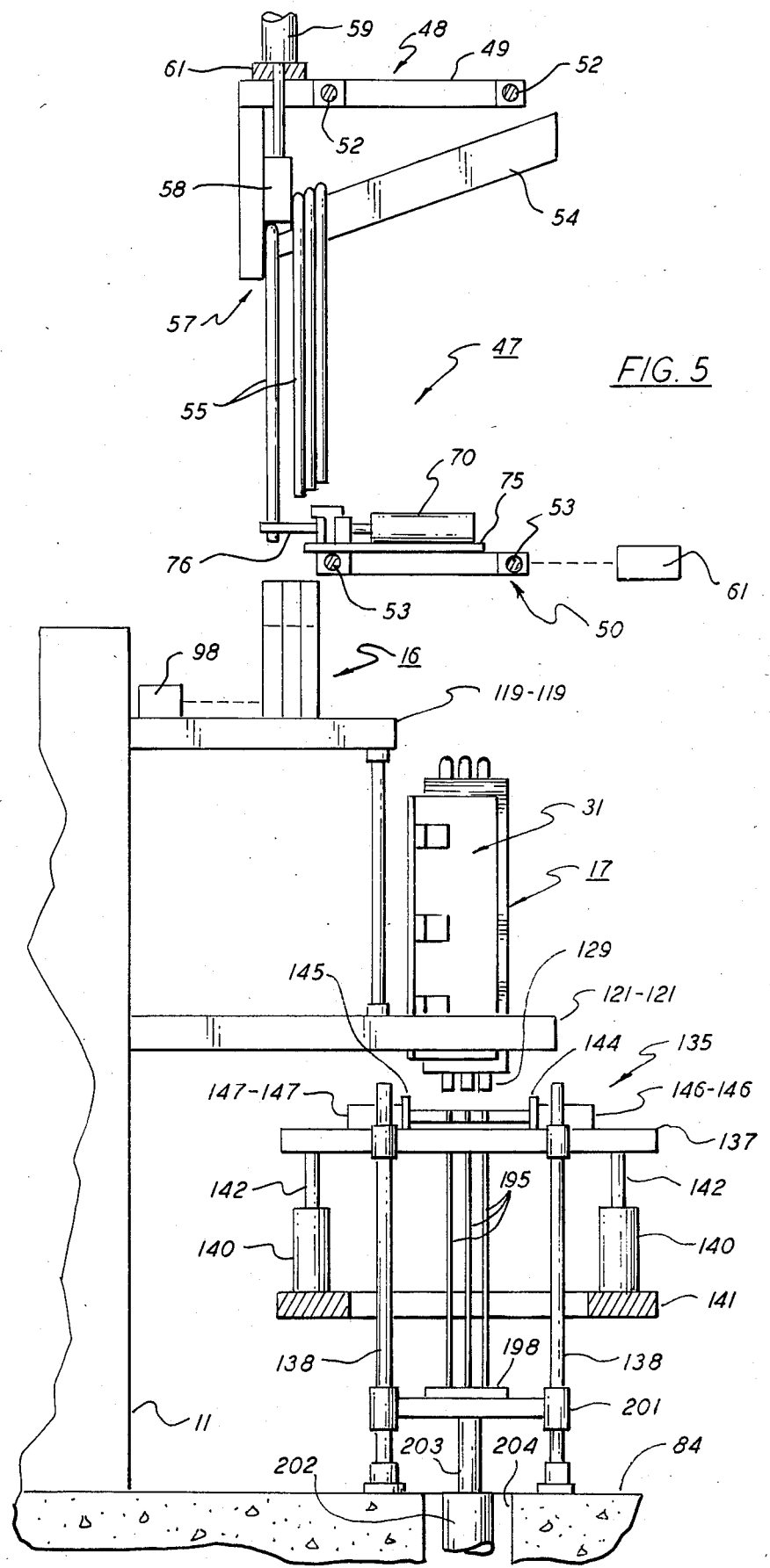
FIG. 5 is a side elevation in diagramatic form showing a fourth processing station for expanding the laced hairpin tubes into locking contact against the fin plates and tube sheets of the unit.
Figure 6:
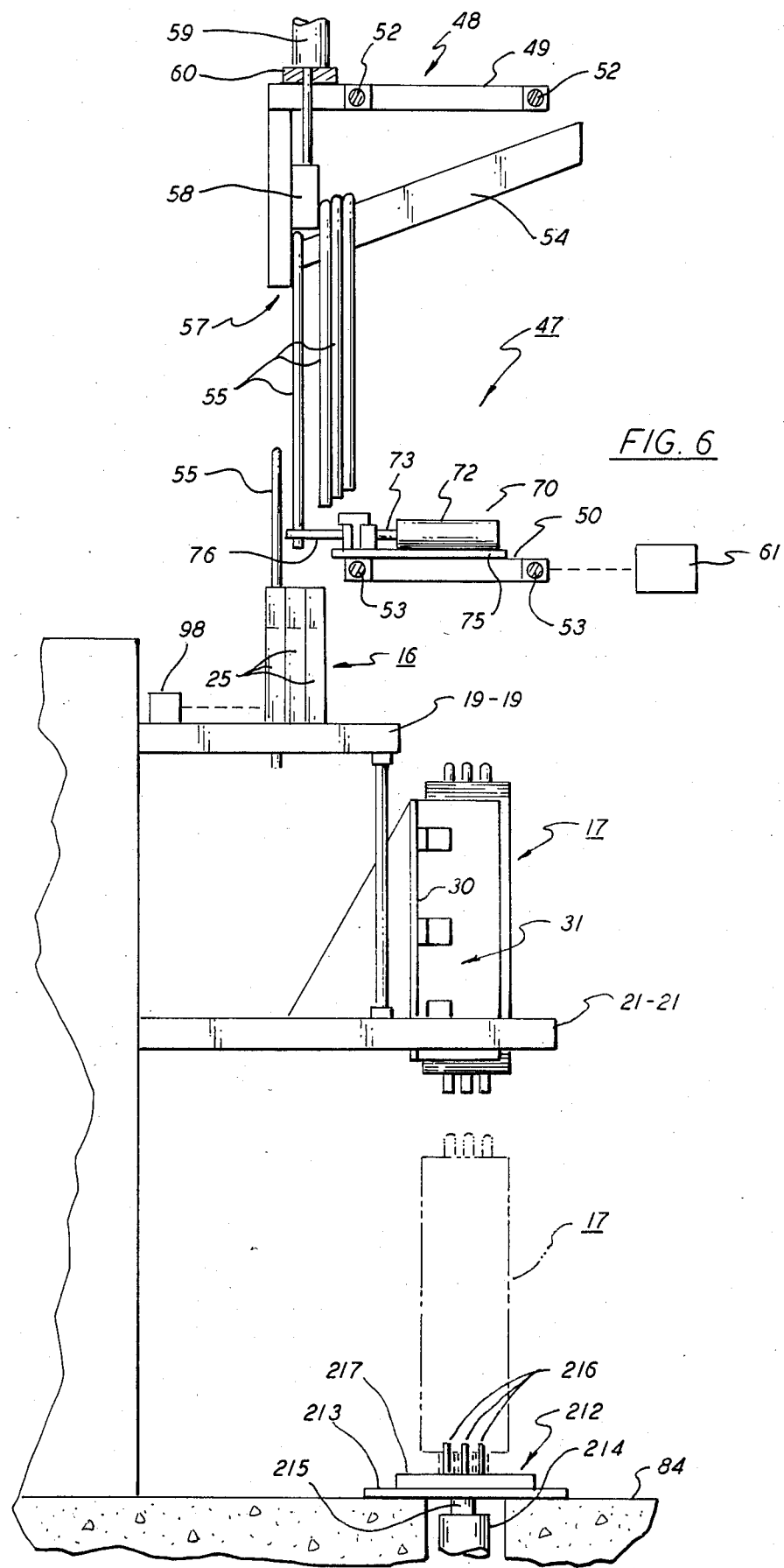
FIG. 6 is a side elevation in diagramatic form showing a fifth processing station for unloading the units from the present apparatus.

An automated tube loader 47 is shown in FIG. 2, positioned over the tube magazine 16 in the loading station. Loaders of similar construction are also shown in the tube expanding station (FIG. 5) and the unloading station (FIG. 6). Each loader operates in an identical manner and includes a movable carriage 48 having an upper member 49 and a lower member 50. The carriage is adopted to ride along upper rails 52—52 and lower rails 53—53 over a linear path of travel that parallels the plane of the tube nest rows.

Figures 21, 22:
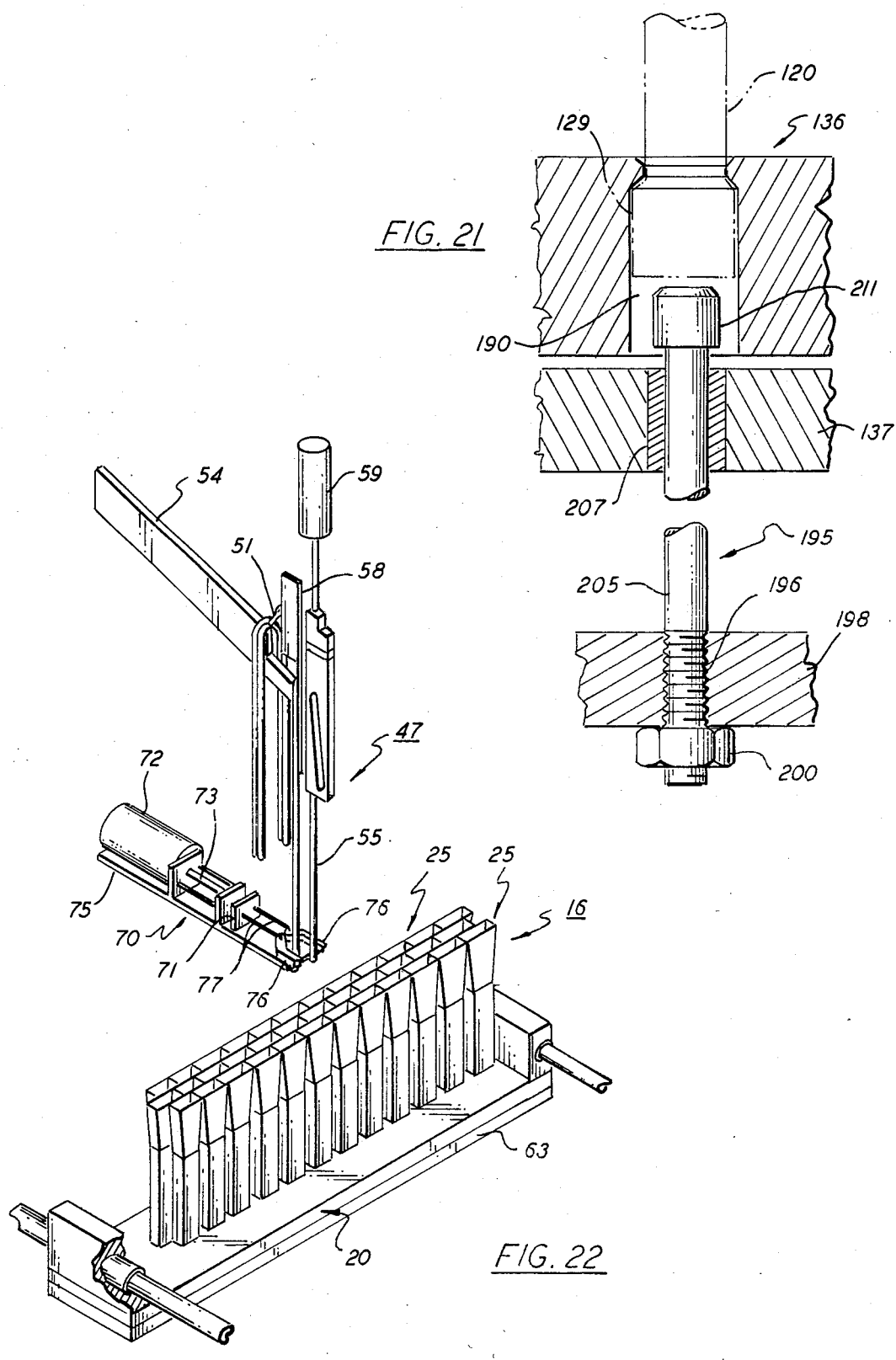
FIG. 21 is an enlarged side elevation in section showing an expansion rod positioned beneath the clamping jaws of the assembly.
FIG. 22 is a perspective view of an automatic tube loader used to fire hairpin tubes into the tube magazine prior to the lacing operation.

With further reference to FIGS. 22 and 23, each loader includes an inclined blade 54 which is of sufficient length to support a series of hairpin tubes 55—55 thereupon that are equal in number to the number of nests contained in each magazine. In operation the hairpin tubes straddle the blade as shown so that the legs thereof point downwardly towards the magazine. The tubes are sequentially gated by a gating mechanism 51 (FIG. 22) into a firing station 57 immediately below a hydraulically actuated ram 58. The action of the ram is controlled by means of a drive cylinder 59 which is mounted upon the upper member 50 within a plate 60, (FIGS. 2, 5 and 6). The tubes are gated into the firing station in association with the movement of the ram so that the tubes can only pass the gate when the ram is retracted. In operation, the carriage is indexed via drive control unit 61 (FIGS. 2, 5 and 6) to place a hairpin tube in the firing station directly over the first empty nest in the selected row and the cylinder 59 is then actuated to rapidly drive the ram into a fully extended position. This, in turn, drives the first gated hairpin tube downwardly into the nest. The platform of the magazine contains a slidable closure plate 63 (FIG. 22) therein which, at this time, is in a closed position. As the hairpin passes into the nest the open ends of the tube legs are seated in abutting contact against the plate. To register the tube within the magazine when the magazine is fully loaded, the tubes are all vertically aligned uniformly against the plate 63.

As schematically illustrated in FIG. 1, the hairpin tubes are loaded directly onto the inclined blade 55 of each loader from a suitable automatic tube bending machine (not shown) using a conveyor, such as chain conveyors 66—66 shown in FIG. 1. The required number of hairpins needed to fill one complete row of nests are moved from the conveyor onto the blade when the loader is in the home position immediately adjacent to the first empty nest in the row being serviced. After the blade is filled with the required number of tubes, the delivery conveyor is deactivated and the loader carriage is sequentially indexed by the drive control unit 61 over each nest in the row and a tube is fired therein. When a complete row is filled, the carriage is rapidly returned to its home position and again readied for another tube loading run.

The geometry of the hairpin tubes coming from the bending machine will vary greatly. Accordingly, insertion of the hairpins into the magazine nests presents certain problems. A gripping mechanism 70 is associated with each tube loader that is adapted to engage the legs of a tube as it is being fed into the firing station and draws the legs inwardly to a point where free passage of the legs into a nest is insured. The gripping mechanism is mounted on the lower support member 75 of the loader carriage adjacent to the firing station. As best seen in FIG. 23, the gripping mechanism includes a horizontally aligned double acting cylinder 72 containing an extendable piston rod 73 which is arranged to drive a block 71 along base plates 75. A pair of quick acting fingers 76—76 are pivotively secured in a second block 74. The fingers are controlled by means of wire connectors 77—77 that extend from block 71. The fingers are adapted to open when the piston rod is in a retractive position as illustrated in FIG. 23. As each hairpin is gated into the firing station, the piston rod is driven forward causing the fingers to initially close over the tube legs as shown in phantom outline in FIG. 23 and then move forward to register the tube ends over the next entrance. The fingers remain in a closed position until such time as the hairpin has been fired into the nest. Once fired, the fingers are quickly retracted into an open position before the nest is gated from the blade into the firing station. The operation of the tube loader is more fully described in a co-pending U.S. application Ser. No. 574,608 entitled tube loading apparatus filed Dec. 22, 1983 in the names of the present inventors and this disclosure is herein incorporated by reference to the extent necessary to more fully understand the operation of the present loading device.

As previously noted, the present magazine contains three rows of tube nests. In practice, the first row is loaded when a magazine is positioned within expanding station D, the second row when a magazine is indexed into subsequent unloading station E and finally the last row when a magazine is indexed into the loading station A. If the heat exchanger being assembled requires more tube rows, more loaders may be added at other processing stations. Alternatively more than one row of nests can be filled at each of the stations containing a loader. It may also be advantageous in some applications to move the magazines in reference to a stationary loader when filling the magazine rows and apparatus using this type of loading system are believed to be within the scope of the present invention.

Figure 25:
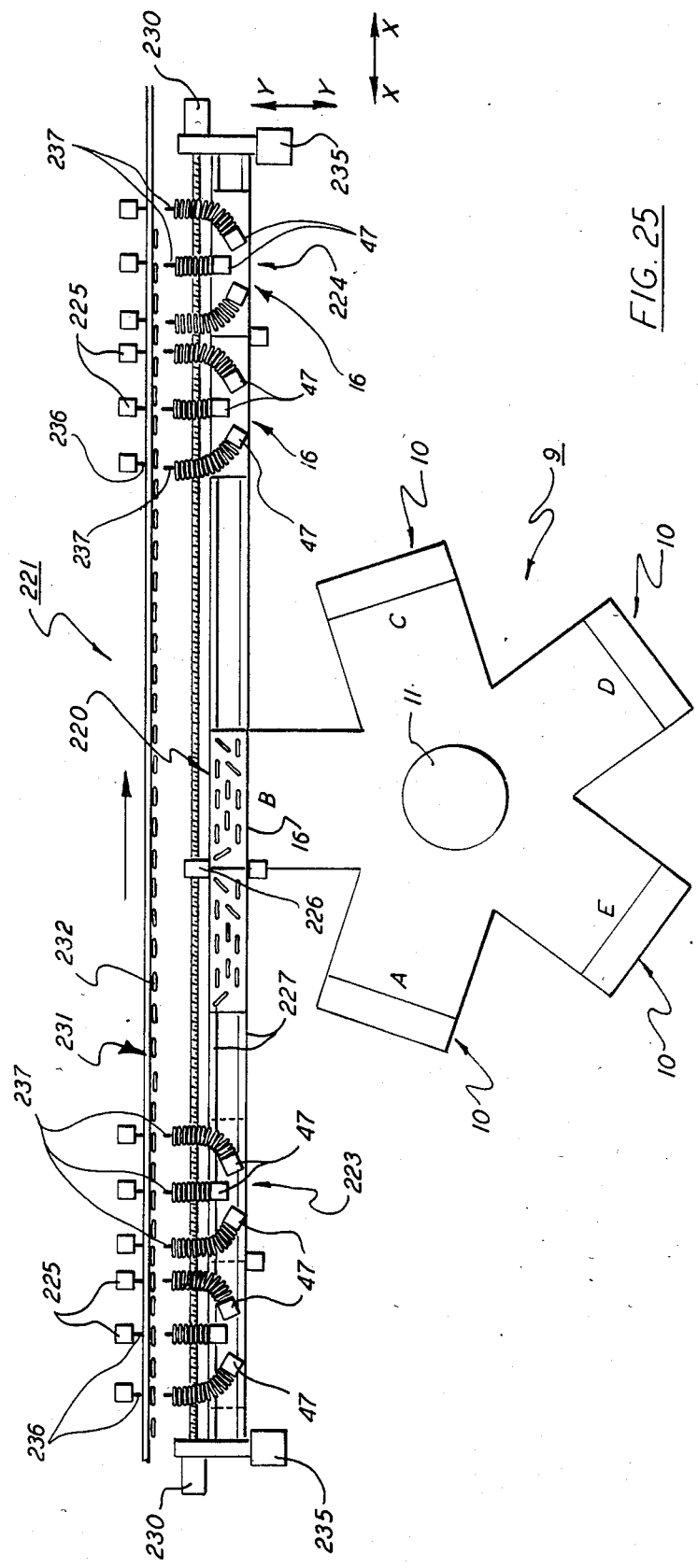
FIG. 25 is an alternate means for loading the tube magazines.

An alternative tube loading mechanism is illustrated in FIG. 25. As shown, a plurality of magazines are loaded at remote loading positions and the fully loaded magazines then registered into the tube lacing station B by means of a reciprocating slide table 221. In this particular embodiment the table has two remote loading positions 223 and 224 located at either end of the table that are able to automatically load two back-to-back magazines 16—16 simultaneously. In operation, there are four separate magazines on the table at one time. A first pair of fully loaded magazines will be located at an unloading position 220 adjacent to the lacing station B and a second pair of empty or partially empty magazines located at one of the two remote loading positions. Each loading position is equipped with a series of tube loaders 47—47 as described above that are stationarily mounted over an y—y indexing platform. The motion of each platform is controlled by a pair of programable controllers that includes a first controller 230 for regulating the movement of the platform in the x—x plane and a second controller 235 for regulating the motion of the platform in the y-y plane.

As illustrated in FIG. 25, a pair of fully loaded magazines are shown located in the unloading position 220 with the first magazine indexed into lacing station B and the second behind it in a standby position. Another pair of now empty magazines are at this time located at the right hand loading position 224. As these magazines are being loaded with tubes, the filled magazines are being registered with fin packs brought into the lacing station and the tubes stored in the magazine laced into the units as will be described in greater detail below. The magazines are mounted upon slide rails 227—227 so that they can be quickly reciprocated between positions using any type of well-known conveyor system. Although not shown, a chain conveyor is mounted beneath the slides that is arranged to engage the magazines and drive them back and forth between positions. The two loaded magazines in the unloading location are further sequenced through the lacing station by means of a sequencer 226. At the same time, the magazines at the loading position 224 are being loaded simultaneously with hairpin tubes from the stationary loaders 47—47. The tube nests of the magazines are indexed beneath the loaders in a programmed sequence via controller 230 and 235 until all the tube nests are filled. As best seen in FIG. 25 the present magazines contain nests that are canted in regard to the linear tube rows. Each loading position thus contains loaders that are correspondingly canted which are capable of filling the canted nest in response to the loading program set into the indexing platforms.

An overhead chain conveyor 231 is used to bring the hairpin tubes 55—55 to each of the loaders via a chain 232. A solenoid actuated pusher assembly 225 is positioned adjacent to each of the loader units 47—47. The solenoids are actuated in an ordered sequence to extend the rods 236—236 toward the loader rails 237—237 and thus carry a hairpin tube from the chain onto the rail thus keeping the loaders 47—47 continuously supplied with tubes.

Figure 3:
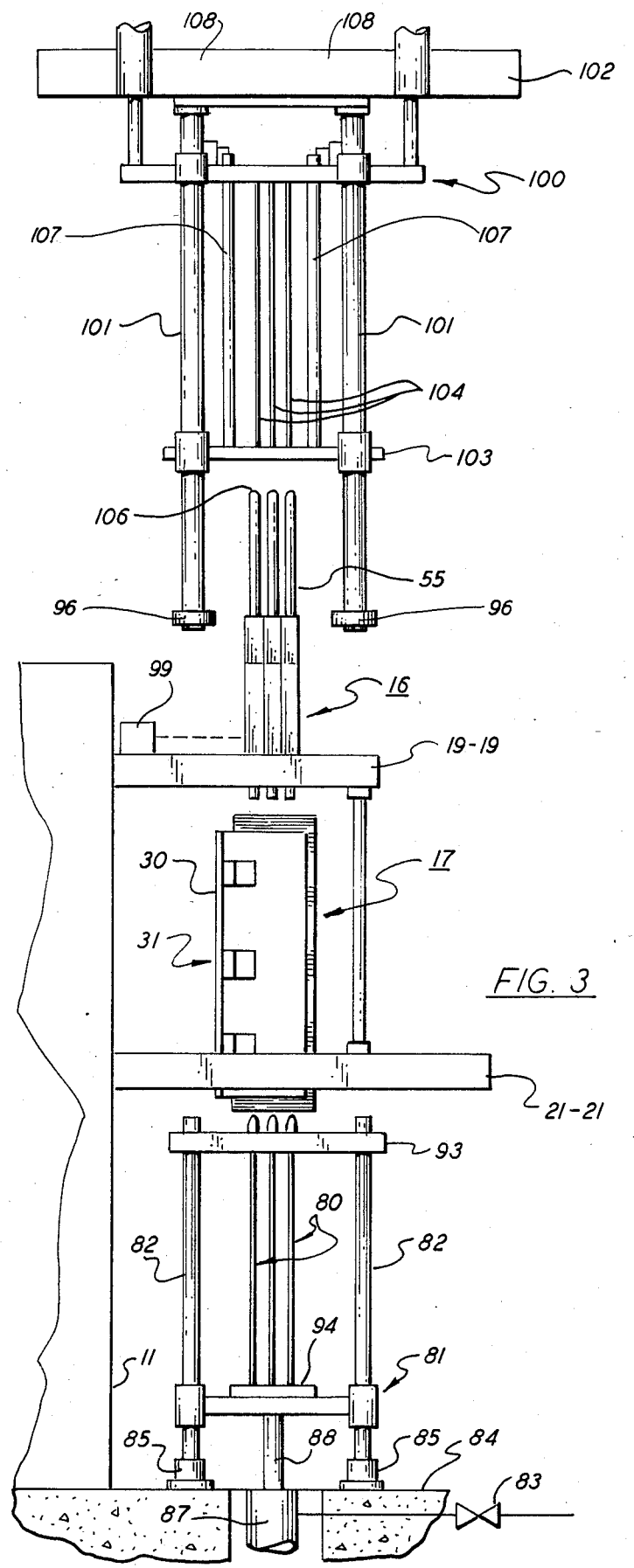
FIG. 3 is a side elevation in diagramatic form showing a second processing station for lacing hairpin tubes into a fin pack loaded into said apparatus.
Figure 8:
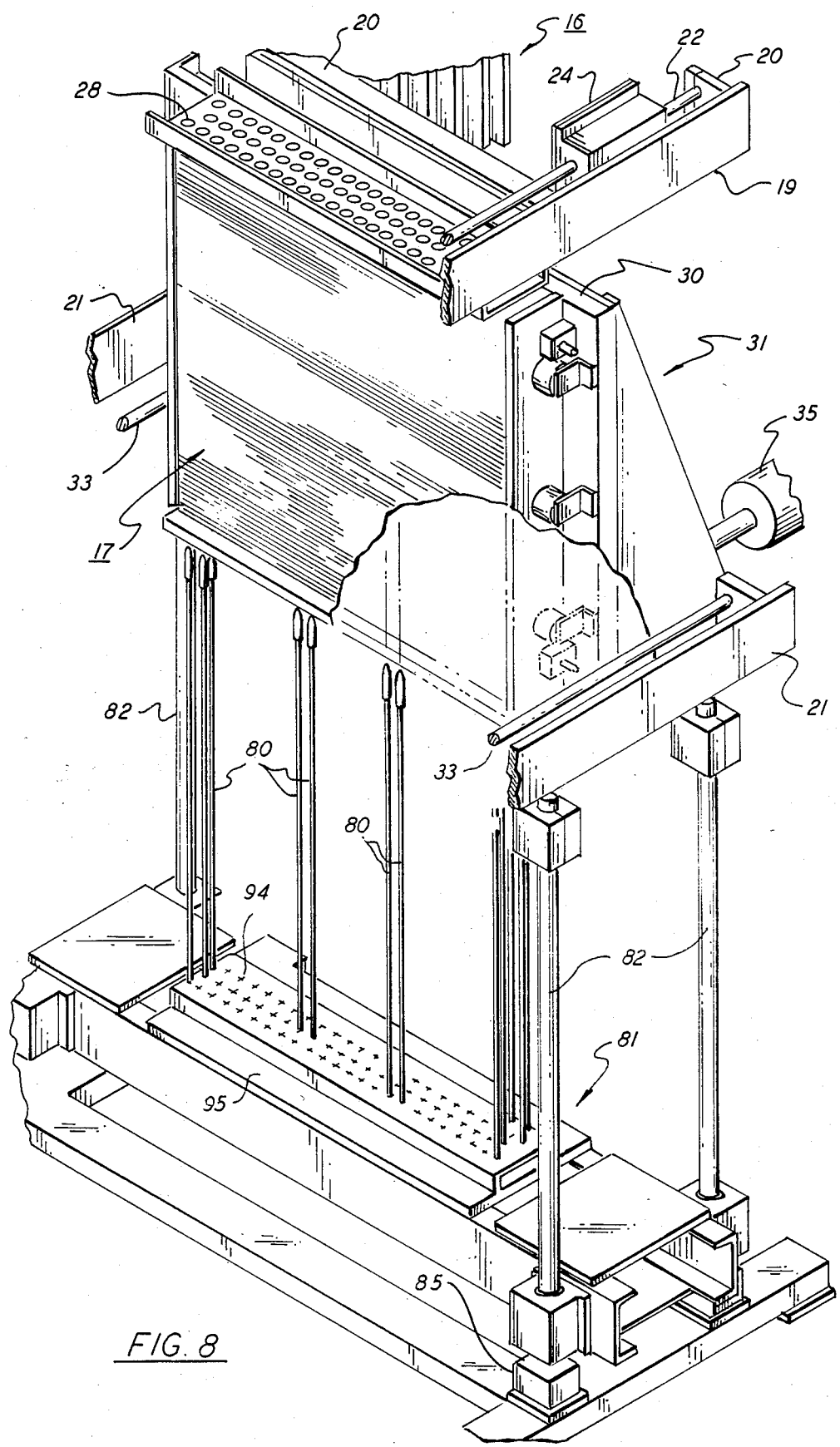
FIG. 8 is a partial perspective view of the lacing station shown in FIG. 3 with portions broken away to show more clearly a number of lacing rods positioned beneath a fin pack unit.
Figure 9:
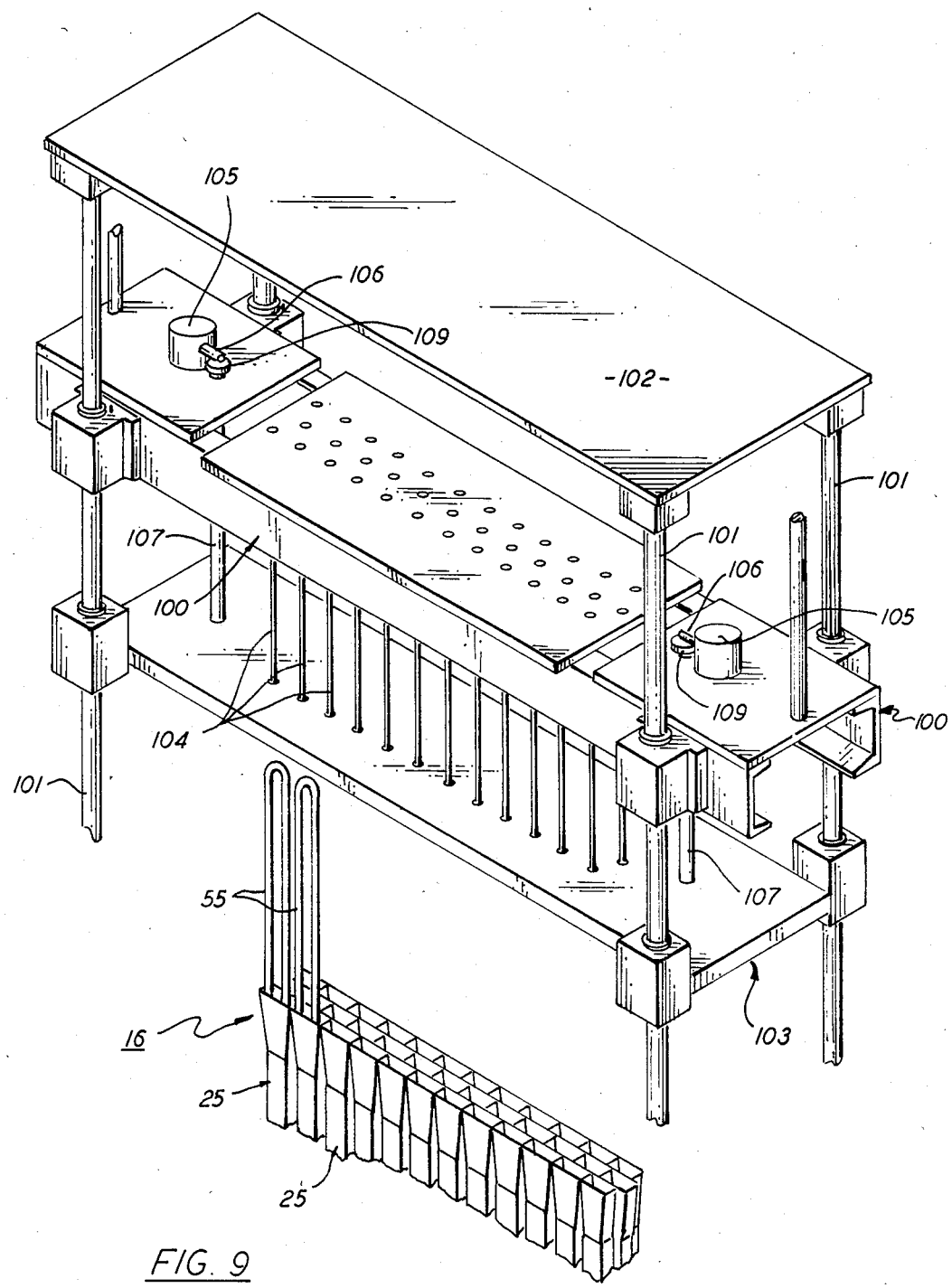
FIG. 9, is a further partial perspective view of the lacing station shown in FIG. 3 with portions broken away to show a series of pusher rods positioned over the tube magazine.

After the tube magazine has been fully loaded in station A, the turntable is indexed to carry the magazine and the fin pack unit contained within the support assembly into the tube lacing station noted B. With further reference to FIG. 3, 8 and 9, the lacing station includes a series of vertically aligned elongated lacing rods 80—80 that are equal in number to the number of holes 28—28 contained in the in-process fin pack unit 17. The rods are mounted upon a hydraulically operated lift 81. The lift includes a plurality of vertically disposed guide rails 82—82 that are anchored securely to the machine base 84 by means of anchor plates 85—85. A movable platform 81 is slidably contained within the rails and is driven therealong by means of a double acting cylinder 87 acting through piston rod 88.

As illustrated in FIG. 14, each lacing rod 80 includes a vertical shank 90 having a frusco-conical shaped head 91 that is securely retained in the distal end of the rod. A radially extended shoulder 92 is also affixed to the rod near the proximal end thereof. Each rod is slidably supported by bushings 97—97 within an upper guide plate 93, the intermediate stop plate 94 and the lower base plate 95. The upper guide plate 93 is stationarily secured to the upper section of the guide rails 82—82 while the stop plate and the base plate are both affixed to the movable lift 81 so as to move in a vertical direction therewith. Normally, the shoulder 92 of the rod is biased into contact against the bottom surface of the stop plate by means of a wound compression spring 96 arranged to act between the top surface 86 of the base plate and the shoulder of the shank as shown in FIG. 14.

When the lift 81 is in a fully retracted position as shown in FIG. 3, the heads of the individual lacing rods are all positioned directly below the tube receiving holes 28—28 contained within the fin pack 17. Raising the lift to a fully extended position, will, in turn, pass the rod through the fin pack and place the heads 91—91 immediately below the platform 20 of the tube magazine 16. At this time, the closure plate 63 (FIG. 22) contained in the platform of the magazine is opened by means of a controlled unit 99 to allow the tubes to be pushed vertically through the nests.

A pair of movable elevators 100 and 103 (FIGS. 3 and 9) are located in lacing station B immediately above the tube magazine 17. The elevators are both slidably supported upon a series of vertically disposed rails 101—101 that are suspended from an overhead mounting bracket 102. A series of vertically extended push rods 104—104 are affixed to the upper elevator 100 by any suitable means and are slidably contained in the lower elevator 103. Each rod is a cylindrical member that is adapted to pass into one of the underlying magazine nests to drive a hairpin tube stored therein downwardly through the nest into the receiving holes of a fin pack unit 17 that has been indexed into the station. Double acting hydraulic pistons 108—108 (FIG. 3) are secured within the bracket 102 and are connected to the upper elevator by means of extendable piston rods. Under the control of the cylinders, the upper elevator is moved up and down over the rail during each tube lacing cycle.

The upper elevator is operatively connected to the lower elevator 103 by means of a pair of vertical standards 101—101. Each standard is locked at its lower end in elevator 103 and adapted to slide within a suitable hole formed in the upper elevator 100. The top of each standard has an expanded head 109 affixed thereto that is adopted to seat against the top surface of the upper elevator as shown in FIG. 9. A pair of rotor assemblies 105—105 are rotatably secured in the upper elevator adjacent to each standard. A horizontally disposed locking pin 106 is anchored in each rotor assembly which is arranged to swing over the top of each standard head to lock the head against the elevator. Turning the rotor in either direction will release the standard and thus allow it to slide vertically within the upper elevator 100.

The standards are each initially locked against elevator 100 when the fin plate unit is indexed into the lacing station B. As illustrated in FIG. 10-13, with the rotors locked against the standards, the upper elevator is initially driven downwardly by the cylinders 108—108. At this time the nests are opened by retracting the closure gate 63 and the lacing rods have been extended by the lower platform 81 to position the heads 91—91 of the lacing rods just below the open magazine nests. The locked standards force the lower elevator 103 to also start moving downwardly in unison with the upper elevator during the initial stages of the lacing process. The distal ends of the push rods 104—104 at this time are recessed within the lower elevator 103 that the elevator presents a flat horizontal surface to the underlying hairpin tubes. The bottom surface of the lower elevator makes initial contact with the tubes to first bring the tubes into horizontal alignment against the bottom surface thereof and then drives the tubes downwardly into the nests. The two elevators continue to move along the rails together until the lower elevator closes against control switch 86 (FIG. 10). A control signal is generated that actuates the rotors to turn the locking pins out of engagement with the standards thereby disconnecting the lower elevator from the upper elevator. Stops 96—96 mounted upon the rails arrest the vertical motion of the lower elevator at this time.

Figure 24:
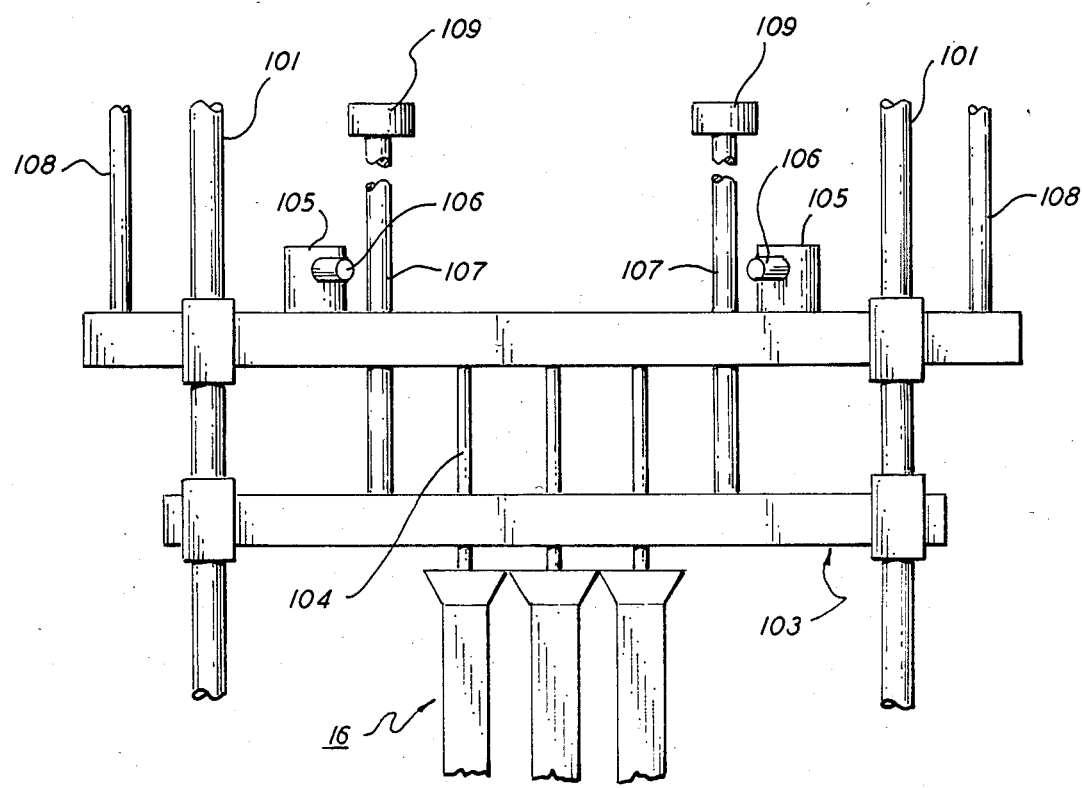
FIG. 24 is an enlarged partial side elevation illustrating a locking mechanism associated with the hairpin lacing rods.

As illustrated in greater detail in FIG. 24, the cylinders 108—108 continue to drive the upper elevator and the push rods 104—104 secured thereto downwardly towards the magazine nests after the lower elevator has been released. Accordingly the push rods are passed through the lower elevator into contact against the hairpin tubes situated within the nests. The push rods, acting under the influence of drive cylinders, pass through the nests to drive the tubes into the receiving holes formed in the fin pack unit. The initial downward movement of the pusher rods places the open ends of the haripin tubes 55 in sealing contact against the heads of the biased lacing rod as illustrated in FIG. 13. Further downward pressure on the pusher rods forces each of the lacing rods to slide downwardly within the plates 93 and 94 thereby compressing the biasing springs 98—98. The lacing rods all assume the same horizontal alignment with platform 81 and correspondingly align the open ends of the hairpin tubes within a common plane thereby correcting for any misalignment that might have occurred during the loading of the hairpins within the nests.

After the tubes have all been aligned upon the lacing rods, the upper elevator, acting through the pusher rods, begins to drive the lower platform down against the holding pressure of the now extended drive cylinder 87. A bleed valve 83 is located in the hydraulic control circuit of the cylinder which serves to maintain a controlled biasing pressure on the cylinder piston that is less than the overall driving force exerted on the platform 81 by the upper drive cylinders 108—108. Accordingly, the platform is retracted under controlled conditions so that the lacing rods remain in guiding contact with the tube ends as the tubes are being laced into the fin pack unit. The tube ends are released by the lacing rods once they have all been extended through the fin pack unit a predetermined distance beyond the lower tube sheet of the unit. By so aligning the tube ends, the accuracy and efficiency of the downstream belling and tube expanding operations are greatly enhanced.

Once the hairpins have been laced into the fin pack unit, both the upper and lower platforms are moved to their respective fully retractive positions thus clearing the magazine and fin pack unit so that the support fixture can be indexed into the next downstream station which is belling station C.

Figure 4:
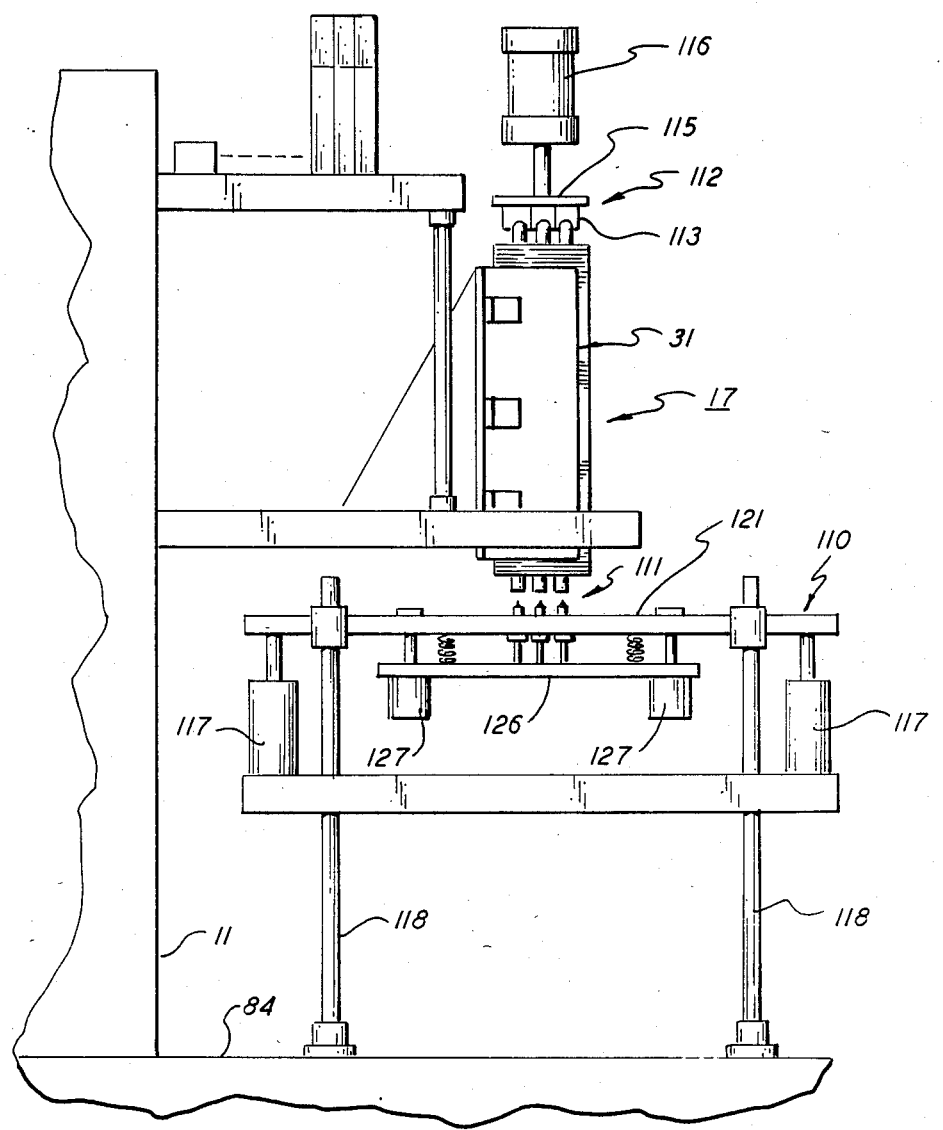
FIG. 4 is a side elevation in diagramatic form showing a third processing station for belling the open ends of hairpin tubes laced in a fin pack.

The tube belling station is illustrated in FIG. 4 and includes a hydraulically actuated table 110 positioned beneath the fin pack unit. The table contains a number of belling tools 111 equal to the number of tube ends protruding from the bottom of the fin pack unit. A movable backing tool 112 is positioned above the fin pack unit and includes a series of downwardly directed countoured saddles 113 that are adapted to seat securely against the hairpin bends to secure the tubes against axial movement while they are being belled. The saddles are secured to common mounting plate 115 which is reciprocated in a vertical direction by means of a double acting cylinder 116. Upon indexing of a fully laced fin pack into the belling station, the saddles are brought down into holding contact against the hairpins as illustrated in FIG. 4. Simultaneously therewith table 110 is moved upwardly by double acting cylinders 117—117 along vertical rails 118—118 to insert the belling tools into the open ends of the hairpin tubes.

Turning now to FIGS. 15-17 there is shown in greater detail the automatic belling tool arrangement utilized in the practice of the present invention. The table 110 consists of a collet plate 121 having a series of holes 122—122 formed therein into which the open end of the hairpin tubes 120 pass as the table is raised into an operative position. The construction of the belling tool is best seen in FIG. 16. Each tool consists of an internal collet 123 having a plurality of outwardly expandable sections which are centered within radially disposed flange 124. An expansion pin 125 passes upwardly through the center of the collet. The expansion pin is a tapered member formed of a hardened metal and is anchored at its base by any suitable means to a pin plate 126 that is positioned immediately beneath the collet plate. ·

The pin plate is operatively connected to the collet plate by means of air cylinders 127—127. Once the collets have been inserted into the tube ends, the pin plate is drawn upwardly by the cylinders 127—127 to pass the tapered pins upwardly within the collets. This, in turn, expands the collet sections outwardly in a radial direction against the tube ends to form bells 129. In final assembly the hairpin tubes are interconnected by smaller return bends 130 (FIG. 17) which are soldered inside the bell openings to complete the heat exchanger flow circuit. The return bends are assembled after the fin pack units have been removed from the present machine and this particular step does not form a part of the present assembly operation.

After the bells have been formed, the pressure on the cylinders 127—127 is relieved and the pin plate is moved back to its initial home position under the influence of biasing springs 131—131. This withdraws the collet pins and releases the pressure on the collet sections so the tool can be removed from the tube ends and the fin pack unit along with the empty magazine is indexed into the next tube expanding station D.

The tube expanding station is shown in greater detail in FIG. 5. A bell clamping assembly generally referenced 135, is positioned beneath the fin pack unit 17 with the station. The clamping assembly is supported upon a movable table 137 carried on vertical guide rails 138—138 that are firmly in the machine base 84. The table is reciprocally driven along the rails by means of double acting cylinders 140—140 which are stationarily secured upon a rest 141. The cylinders are connected to the table via piston rods 142—142.

Figure 18:
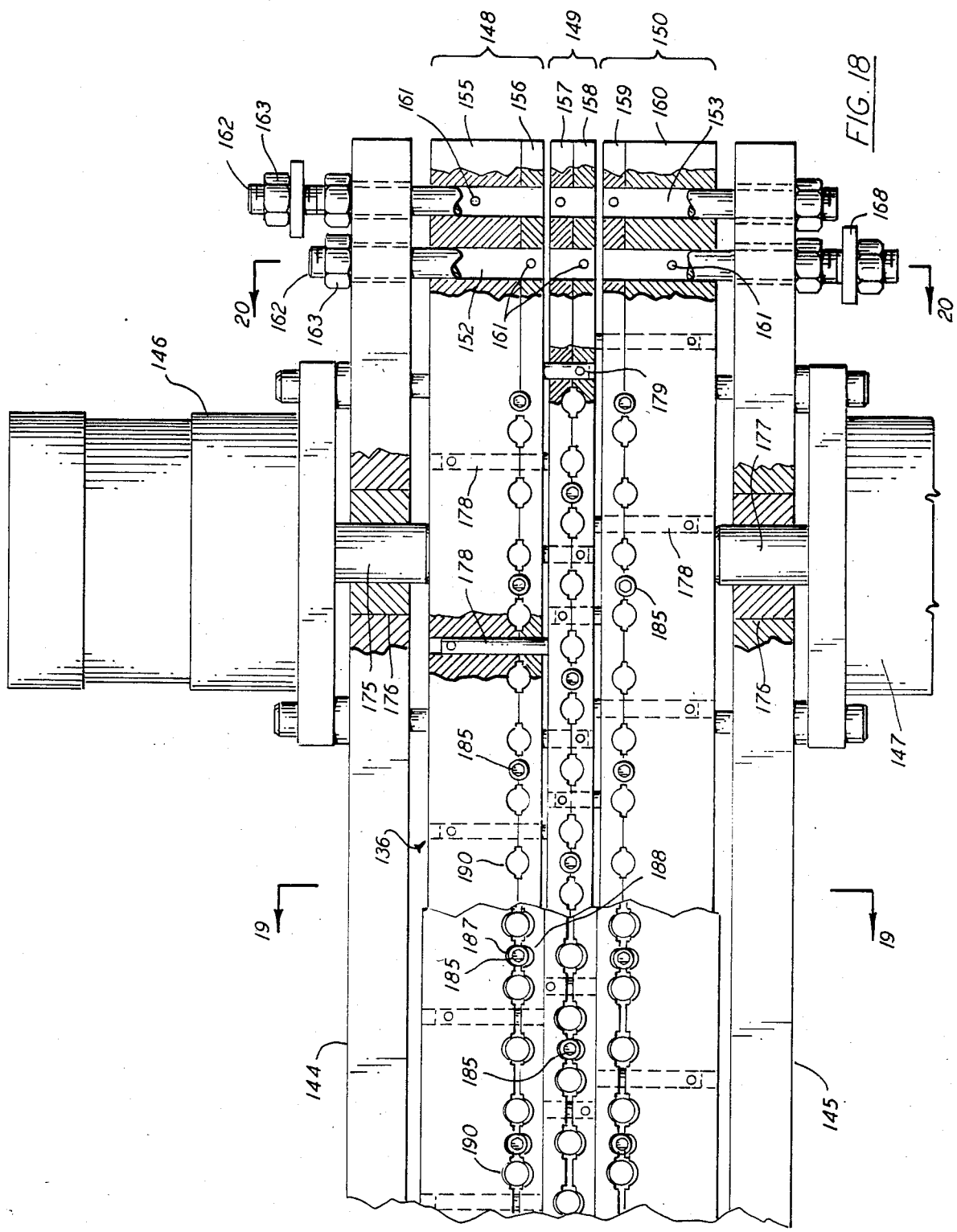
FIG. 18 is a top view of the tube clamping assembly used in the expansion station shown in FIG. 5 further showing a portion of the clamping device in a closed condition and a portion in an open position.
Figure 19:
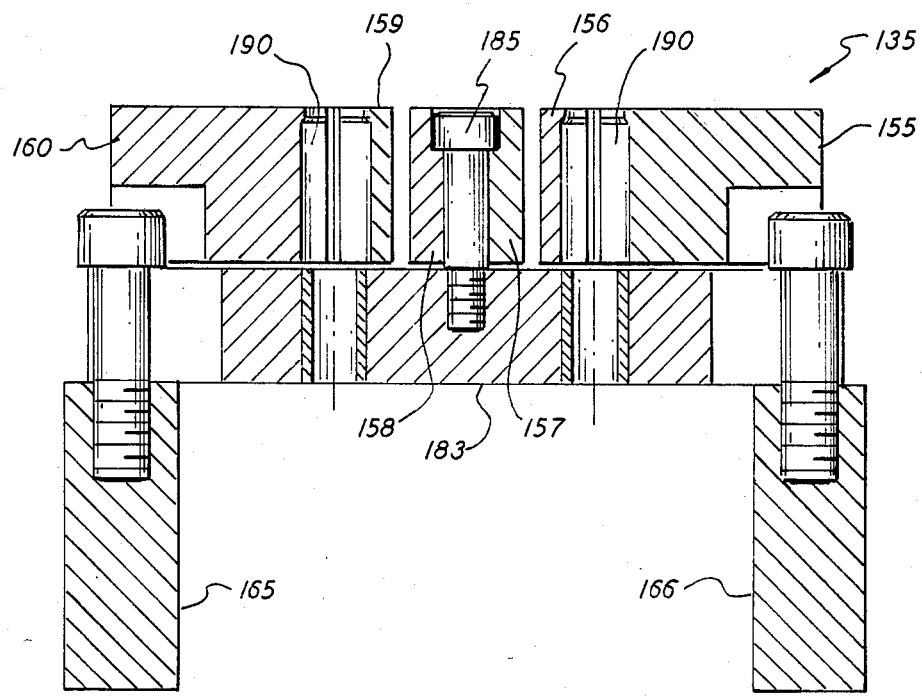
FIG. 19 is a section taken along line 19—19 in FIG. 18 further showing the construction of the clamping assembly.
Figure 20:
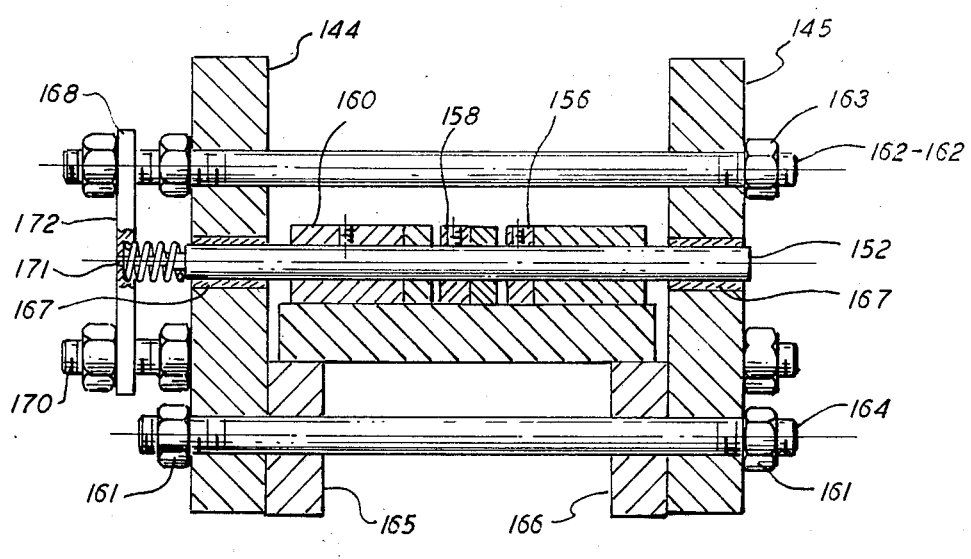
FIG. 20 is a section taken along lines 20—20 in FIG. 18 showing the construction of one end of the clamping assembly.

With further reference to FIGS. 18-20 the bell clamping assembly includes a pair of stationary sidewalls 144 and 145 that are secured to the table 137 by any suitable means. A pair of cylinders 146—146 are secured to the outboard ends of wall 144 while a second pair of cylinders 147—147 are similarly secured to the outboard ends of sidewall 145. The clamping assembly 136 includes three pairs of co-acting jaws 148—150. Each jaw pair is adapted to engage the bell ends associated with one row of hairpin tubes contained in the fin pack unit. In the present case, where the fin pack unit contains three rows of hairpin tubes, three pairs of jaw members are required to complete the desired clamping action. The number of jaw pairs utilized, of course, can be changed to accommodate fin pack units having more or less tube rows. The cylinders act in concert to move the jaws between a closed position as depicted at the right hand side of FIG. 18 and an open position as depicted at the left hand side of the same figure.

The three pairs of jaws are suspended between the sidewalls 145 and 144 by two coacting sets of slide bars positioned at either end of the assembly. Each set includes an inner slide bar 152 and an outer slide bar 153 each of which passes laterally through holes provided in each jaw pair member. The first jaw pair 148 is made up of jaw members 155 and 156, the second jaw pair 149 is made up of jaw members 157 and 158 while the last jaw pair 150 is made up of jaw members 159 and 160. Alternate jaw members 155, 157 and 159 are secured to the outer slide bar 153 by means of pins 161 so that the jaw member moves therewith while the opposing jaw members are similarly secured to the inner slide bar 152.

As illustrated in FIG. 20, an upper pair of tie rods 162—162 are passed through the sidewalls of the assembly at either end thereof. The tie rods are held in place by nuts 163—163 and serve to prevent the walls from buckling outwardly when the jaws are clamped together. A second pair of similar tie rods 164—164 are arranged to secure the sidewalls to mounting blocks 165 and 166 which are affixed by any suitable means to either end thereof. The tie rods are held in place by nuts 163—163 and serve to prevent the walls from buckling outwardly when the jaws are clamped together. A second pair of similar tie rods 164—164 are arranged to secure the sidewalls to mounting blocks 165 and 166 which are affixed by any suitable means to the table 137. As illustrated, the slide bar 152 is retained in the sidewalls by means of bushings 167—167. A retaining bracket 168 is mounted between one of the upper tie rods and a stud 170 threaded into the sidewall 144. The bracket passes over the reduced end 171 of the tie rod and a coil spring 172 is arranged to act between the bracket and the rod to bias the rod away from the bracket, as indicated by the arrow. As can be seen, alternate jaw members 156, 158 and 160 which are pinned to the slide bar 152 are thus moved under the biasing action of the spring toward a normally open position.

The outer slide bar 153 is similarly mounted in the assembly. However, as best seen in FIG. 18, bar 153 is biased to act in the opposite direction. The slide bar thus normally moves attached jaw members 155, 157 and 159 into an open position Under the combined action of the slide bars, the jaw pairs are normally printed sufficiently to permit the belled end of the tubes to pass into the contoured cavity 190 formed therein.

Cylinders 146 and 147 are adapted to close the normally opened jaw pairs. Cylinders 146, which are mounted upon sidewall 144, each contain an extendable arm 175 that passes through a bushing 176 into pushing contact against jaw member 155. Cylinders 147 are similarly disposed in sidewall 145 to push against jaw member 160 using arm 177. Pushing on the two outer jaw members with the cylinders thus causes the three jaw pairs to close simultaneously through means of the noted slide bars. To aid in the closing process, secondary push rods 178 and 179 are provided which are adapted to apply a uniform closing force on the jaws across the length of the assembly so that the jaws will not bow during closure.

As shown in FIG. 19, a bushing plate 183 is secured to the top surfaces of the support blocks 165 and 166 immediately below the clamping assembly. A series of raised stop members 185—185 are threaded into the busing plate so that each stop extends upwardly between an opposing pair of jaw members. Coacting semicircular grooves 187 and 188 are formed in the opposing members which are adapted to close against the stops when the jaws are brought together. The radial pressure of the jaw member is exerted against the stops rather than the tube walls 190 thereby preventing unwanted deformation of the bell ends during closure. The grooves 187 and 188 are formed to hold the bell shaped tube ends in such a way that the upper portion of the bell tapes extends above the jaws to permit the bell to seat within the tube sheet.

Referring now more specifically to FIGS. 5 and 21, there is shown a series of expansion rods 195—195 that are arranged to be driven upwardly through the hairpin tubes to expand the tubes radially into locking contact against the fin plates and tube sheets of the overlying fin pack unit 17. The proximal end of each rod is threaded into a hole 196 provided within a movable base plate 198 and is locked in place using a locking nut 200. The rods are aligned vertically within the base plate and the base plate, in turn, is secured by any suitable means to a lifting platform generally referenced 201 in FIG. 5. The lifting platform is slidably supported between the rails 138—138 and is driven by means of a double acting piston 202 via extendable arm 203 along the rails. The piston is housed within an opening 204 formed in the base 84 of the machine.

As best seen in FIG. 21 the elongated shank 205 of each rod is slidably received within the previously noted clamping table 137 by means of a bushing 207. The table is thus able to move vertically over the shanks of the rods to permit the clamping assembly to be raised and lowered in reference to the stationary tube bells 129—129. The table 137 is shown in a fully raised position in FIG. 21 with the jaws of the clamping assembly closed over the belled end 129 of a hairpin tube 120. The extending head 211 of the tool, at this time is seated within the contoured cavity 190.

With the bells securely held within contoured cavities of the clamping assembly, the elevator 201 is moved from a retracted position to a fully extended position. This causes the expansion tools 211 to be driven upwardly through the open end of the hairpin tubes. An interference fit is provided between the interior wall of each tube and the outside periphery of the expanding tool so that the tubes are deformed outwardly in a generally radial direction. Because the tubes are held at the bells when the expansion process is being carried out, the tubes are placed in tension as the walls are expanded. This assures that the bell end of each tube will remain aligned within a common plane a given distance from the bottom tube sheet. Driving the expanding tool through the tubes, expands the tube bells outwardly into locking contact against the surrounding fin plates thereby closing the assembly.

As noted above, a tube loader 47, the operation of which has been more fully explained in detail in reference to loading station A, is also positioned in the tube expanding station D. As best illustrated in FIG. 5, the loader is adapted to insert hairpins into the first row of nests contained within tube magazine 16. After the expansion rods have been withdrawn from the tubes and the first row of nests in the magazines 16 has been loaded, the magazine and fin pack unit are indexed into the next downstream station which is unloading stations E shown in FIG. 6. Here, the assembled fin pack unit 17 is unloaded onto an elevator 212 . The elevator is mounted within the base 84 of the machine and includes an off-loading platform 213 which is raised or lowered by means of a double acting cylinder 214 acting through piston rods 215. The platform includes a series of upraised pins 216—216 that are adapted to pass into the belled ends of the hairpin tubes when the elevator is in a fully extended position. The belled ends of the tubes, at this time, rest upon a soft pliable pad 217. Once securely seated upon the elevator, the clamping members used to secure the fin pack units in the support assembly are opened and the elevator is quickly lowered to clear the unit. The assembled fin pack unit is off-loaded from the elevator using any suitable means and is then transported to a downstream work station (not shown) for further processing.

While in the unloading station, the second or middle row of nests contained in the tube magazine is also loaded with hairpins. Again, a loader 47 as previously described is used to complete the hairpin loading operation. Accordingly, when the magazine returns once again to the loading station A, there remains only one final row of nests to be inserted into the magazine preparator to carry out the lacing operation.

It should be evident from the disclosure above, that the present machine is capable of assembling hairpin tubes into a fin pack unit using a minimum amount of time and space. By clamping a fin pack unit in the machine as herein described, the perforated top and bottom tube sheets of the unit are completely exposed and all further operations thereon can be carried out in an unimpeded manner without having to remove the unit from the clamping fixture. Through use of vertically disposed tube magazine, the hairpin tubes can be accurately and quickly assembled for lacing. Furthermore, once the magazine has been loaded, the hairpin tubes can be simultaneously passed into the fin pack unit in a single operation thus saving a considerable amount of time while using a minimum amount of space and equipment. It should be further noted that the present machine is also capable of automatically belling and expanding the tubes while the tools are held in tension thereby providing for repeated production of accurately assembled units at a rate that has heretofore not been attainable in the arts.

While this invention has been disclosed with specific reference to the detailed description set forth above it is not confined to this specific structure and this application is intended to cover any modifications and changes that may come within the scope of the following claims.

We claim:

1. A method of mounting hairpin tubes in a fin pack unit of the type wherein flat heat exchanger plates are stacked between a pair of tube sheets and parallel rows of tube receiving holes pass through the unit between the tube sheets that includes the steps of
   automatically loading the hairpin tubes into a tube magazine,
   locating the loaded magazine adjacent to one of the tube sheets of the unit so that the tubes are axially aligned with the parallel rows of tube receiving holes,
   driving the hairpin tubes from the magazine through the parallel rows of tube receiving holes in said unit so that the open ends of the tubes extend a predetermined distance beyond the other of said tube sheets,
   forming radially expanded bells in the extended ends of the tubes,
   clamping the bells to prevent the open ends of the tubes from moving, and
   expanding the walls of the tubes outwardly into contact against the fin plates and tube sheets while the tube ends are clamped in a fixed position.

2. The method of claim 1 that further includes the step of securing the unit in a holding fixture prior to driving the hairpin tubes through the tube receiving holes.

3. The method of claim 2 that further includes the steps of loading the magazine at a remote station and moving the magazine into registration with the unit secured within the holding fixture.

4. The method of claim 1 that further includes the steps of extending guide rods through the tube receiving holes of said unit placing a resilient holding pressure against the extended rods that is less than the force used to drive the tubes from the magazine engaging the open ends of the tubes with said guide rods as the tubes are driven from the magazine whereby the tubes are pushed through the unit in guiding contact with said rods.

5. The method of claim 4 that includes the further step of mounting each of the guide rods upon a spring for biasing the rod toward the open end of a hairpin tube, the biasing force of each spring being less than the holding force placed on the rods whereby the rods are all depressed to an equal depth by said tubes to align the tubes as they are passed through the unit.

6. The method of claim 2 that includes the further step of sequentially indexing the holding fixture after the tubes have been driven therein into registration with a series of belling tools for forming the bells in the tube ends and then a series of expanding tubes for moving into the tubes through the clamped end thereof.

7. The method of claim 1 that further includes the step of aligning the top of the hairpin tubes in a common plane prior to driving the hairpins into the unit.

8. Apparatus for automatically mounting hairpin tubes in a fin pack unit of the type wherein flat heat exchanger plates are stacked between a pair of tube sheets and parallel rows of tube receiving holes are formed in the unit which pass between the tube sheets that includes
   a tube magazine for locating the hairpin tubes in axial alignment with the parallel rows of tube receiving holes formed in one of the tube sheets of the unit,
   means to drive the tubes from the magazine through the tube receiving holes to locate the tube ends of the tubes a predetermined distance beyond the other of said tube sheets,
   a belling means for forming radially expanded bells in the extended ends of the tubes,
   clamping means for securing the belled end of the tubes against movement, and
   expanding means for moving a series of expanding tools into the tubes through the clamped ends thereof to expand the walls of the tubes into contact with the tube sheets and plate fins of the unit.

9. The apparatus of claim 8 that further includes an automatic loading means for placing the hairpin tubes into said magazine.

10. The apparatus of claim 8 wherein said automatic loading means is located at a remote station and further includes an indexing means for moving the loaded magazine into registration with said unit.

11. The apparatus of claim 8 that further includes a holding fixture for supporting the said unit, said holding fixture having coacting members for locking against the sidewalls of the unit to provide free access to the tube sheets.

12. The apparatus of claim 8 wherein said means to drive the tubes from said magazine includes a flat plate, means for moving the plate axially into contact with the top of the tubes contained in the magazine to align the tubes within a common plane, push rods arranged to pass through said plate into driving contact with the aligned tubes and means to drive the push rods through the magazine whereby the tubes are passed into the tube receiving holes of the unit.

13. The apparatus of claim 8 that further includes guide means for engaging the tubes as they are driven through the tube receiving holes and guiding said tubes through said holes.

14. The apparatus of claim 13 wherein said quide means include a series of guide rods equal in number to the number of tube receiving holes, and means to extend the guide rods through the holes into engagement with the tubes.

15. The apparatus of claim 14 that further includes means to hold the guide rods in engagement with the tubes with a force for driving the tubes from the magazine whereby the tubes are moved through the holes in contact with the guide rods.

16. The apparatus of claim 15 that further includes spring means acting upon each of the guide rods for biasing the rods axially toward said tubes, the spring biasing force being less than the holding force exerted upon the tubes whereby the rods are depressed by the tube upon initial engagement therewith to align the ends of the tube.

17. The apparatus of claim 11 that further includes means to sequentially index the holding fixture adjacent to the belling means wherein the bells are formed in said tube ends and adjacent to the clamping means wherein the belled end of the tubes are secured and the tubes are expanded into the unit.

18. Apparatus for mounting hairpin tubes in a fin pack unit of the type wherein flat heat exchanger plates are stacked in alignment between a pair of tube sheets and having parallel rows of tube receiving holes passing through the plates and tube sheets that includes a lacing station containing a tube magazine for storing hairpin tubes adjacent to one of the tube sheets of a unit positioned in said station with the tubes being supported in axial alignment with the tube receiving holes formed in the unit, means to drive the hairpin tubes simultaneously from the magazine through the rows of tube receiving holes in said unit to extend the open ends of the tubes a predetermined distance beyond the opposite tube sheet, a belling station containing a series of belling tools equal in number to the number of tubes extending through a unit positioned in said station, and means to bring the belling tools into expanding contact with the extended ends of the tube contained in said unit to form bells therein, an expanding station containing a clamping means for closing over the belled ends of the tubes of a unit positioned in said expanding station to secure the tube ends against movement, expanding rods equal in number to the number of tubes contained in said unit positioned adjacent to the open ends of the tubes secured in said clamping means, and means to pass the rods into said tubes to expand the walls of the tubes into contact against the tube sheets and the fin plates of the unit, and a conveyor means for sequentially indexing the units into each of the processing stations whereby the units positioned in each of said stations are processed simultaneously.

19. The apparatus of claim 18 where said conveyor means is arranged to move over an endless path of travel through said processing stations and further includes a series of holding fixtures having coacting jaw members for clasping the units between the sidewalls thereof.

20. The apparatus of claim 18 that further includes loading means for inserting hairpin tubes into the tube magazine.

* * * * *